United States Patent
Zeisel et al.

(10) Patent No.: US 6,669,754 B1
(45) Date of Patent: Dec. 30, 2003

(54) METHOD FOR OPTIMIZING THE LAYOUT AND OPERATION OF A REDUCTION METHOD

(75) Inventors: Helmut Zeisel, Linz (AT); Georg Aichinger, Asten (AT); Johann Wurm, Bad Zell (AT); Hermann Druckenthaner, Linz (AT); Heinz Engl, Linz (AT); Andrea Schatz, Ried i. R. (AT); Gerald Gökler, Bad Hall (AT)

(73) Assignee: Deutsche Voest-Alpine Industrieanlagenbau GmbH (DE)

( * ) Notice: Subject to any disclaimer, the term of this patent is extended or adjusted under 35 U.S.C. 154(b) by 0 days.

(21) Appl. No.: 09/914,571

(22) PCT Filed: Feb. 23, 2000

(86) PCT No.: PCT/EP00/01463
§ 371 (c)(1),
(2), (4) Date: Nov. 7, 2001

(87) PCT Pub. No.: WO00/52214
PCT Pub. Date: Sep. 8, 2000

(30) Foreign Application Priority Data

Mar. 3, 1999 (AT) ................................................ 361/99

(51) Int. Cl.⁷ ............................................. C21B 11/00
(52) U.S. Cl. ............................. 75/375; 75/380; 75/384; 75/385; 75/492; 266/80
(58) Field of Search ......................... 75/375, 380, 384, 75/385, 492; 266/80

(56) References Cited

U.S. PATENT DOCUMENTS 4,861,369 A * 8/1989 von Bogdandy et al. ..... 75/492

FOREIGN PATENT DOCUMENTS

| | | |
|---|---|---|
| DE | 2835548 | 2/1980 |
| DE | 19513547 | 10/1996 |
| DE | 19637917 | 3/1998 |
| DE | 19715503 | 10/1998 |
| JP | 55-054515 | 4/1980 |
| JP | 63-083210 | 4/1988 |
| JP | 8-295910 | 11/1996 |

OTHER PUBLICATIONS

H. Druckentanner, et al., "Automation Of Blast Furnaces—An Effective Means Of Maximizing Efficiency In Smelting", *Metallurgist*, vol. 41, No. 12, 1997, pp. 433–434.

H. Druckentanner, et al., "Blast Furnace Automation for Maximising Production Economy", *Steel Times International*, Jan. 1997, pp. 16–18.

E.L. Sukhanov, "Model of the Thermal Regime of Blast-Furnace Smelting", *Steel in Translation*, vol. 27, No. 8, 1997, pp. 15–18.

* cited by examiner

Primary Examiner—Melvyn Andrews
(74) Attorney, Agent, or Firm—Ostrolenk, Faber, Gerb & Soffen, LLP

(57) ABSTRACT

A description is given of a method of optimizing the design and operation of a reduction process for iron-containing charge materials (3), preferably in lump form, in a reduction shaft (1) to which reduction gas (9) is fed, for example from a fusion gasifier (6), with a reduced product (13), for example iron sponge, being taken from the reduction shaft (1) for the production of liquid pig iron or liquid primary steel products, in which method the reduction process is described by means of a mathematical-physical-chemical process model, the reduction shaft (1) is modelled multi-dimensionally, in particular three-dimensionally, and the process model is numerically evaluated and the results of the evaluation, obtained as multi-dimensional, in particular spatial, distributions of physical or chemical variables, are taken into account for the reduction process. This allows the reduction process to be quantitatively assessed in the entire reduction shaft and, as a result, the reduction process can be optimized.

33 Claims, 2 Drawing Sheets

METHOD FOR OPTIMIZING THE LAYOUT AND OPERATION OF A REDUCTION METHOD

The invention concerns a method of optimizing the design and operation of a reduction process for iron-containing charge materials, preferably in lump form, in a reduction shaft to which reduction gas is fed, for example from a fusion gasifier, with a reduced product, for example iron sponge, being taken from the reduction shaft for the production of liquid pig iron or liquid primary steel products.

The reduction shaft may be, for example, the shaft of a direct reduction process or the prereduction stage in the solid phase of a smelting reduction process. In the latter case, the charge materials, such as iron ore, preferably in the form of lumps or pellets, if appropriate with additions, in the production of liquid pig iron or liquid primary steel products are reduced in a reduction shaft directly to form iron sponge and the latter is charged into a fusion gasifying zone and smelted there while carbon carriers and oxygen-containing gas are fed in. This produces a CO- and $H_2$-containing reduction gas, which is drawn off from the fusion gasifying zone and introduced into the reduction shaft, where it is converted and, once reduction of the iron-containing charge materials has taken place, is drawn off as top gas.

In a production process of this type, it is difficult to estimate the optimum level of production, since specific properties of the charge materials, such as stability, friability during the reduction or agglomeration, and of the reducing agents influence production.

Even today, new plants are still operated on the assumption that the raw material and reducing agents will be of high quality, which does not reflect the supply situation in the raw materials sector. Shortages in raw material supplies, and associated production stoppages are the consequence, since the limits for operation with raw materials of lower quality are not known.

On the other hand, in the design of new reduction shafts of increased or changed geometry and in the use of changed charge materials in existing plants there are uncertainties as to the effects of these changes. Uncertainties exist in particular with respect to the material flow, the dead zones of the burden and their effect on the gas flow. These uncertainties can also only be dispelled partly by experiments on actual plants or scale models. Therefore, when assessing the influence on the reduction process of the geometry of the reduction shaft and the characteristics of the raw materials, it is still necessary to rely on the experience gained from operating existing reduction plants and is very risky in particular to apply findings to previously untried geometries or charge materials, with no objective or quantitative conclusions being possible.

Already existing so-called "black box" models take into account the processes in the reduction plant or in the reduction shaft only inadequately, since these models are based on empirical relationships but cannot provide any information concerning the internal states of the reduction shaft.

The object of the present invention is thus to overcome the disadvantages mentioned by developing a method with which a reduction process can be quantitatively assessed in the entire reduction shaft and, as a result, the reduction process can be optimized.

The invention is characterized in that the reduction process is described by means of a mathematical-physical-chemical process model, in that the reduction shaft is modelled multi-dimensionally, in particular three-dimensionally, in that the process model is numerically evaluated and the results of the evaluation, obtained as multi-dimensional, in particular spatial, distributions of physical or chemical variables, are taken into account for the reduction process.

What is novel about this invention is that it allows for the first time a multi-dimensional quantitative determination of the physical and chemical variables in the entire reduction shaft and consequently objectifiable statements can be made concerning the reduction process, so that the use of this simulation tool means that there is less risk involved in the design and operation of new plants as well as the operation of existing plants with changed charge materials.

For the creation of the process model, the geometrical dimensions of the reduction shaft, the chemical and physical properties of the individual substances involved in the process, the boundary conditions necessary for solving the differential equations and the process parameters serving for controlling the reduction process are prescribed.

The result of the calculation of the process model provides for each phase at least the spatial distribution of pressure, velocity, volume fraction, chemical composition and the spatial temperature distribution in the reduction shaft.

The invention may be applied particularly advantageously to a prereduction stage, mentioned at the beginning, in the solid phase of a smelting reduction process, in that the mathematical-physical-chemical process model is created for a reduction shaft to which reduction gas is fed from a fusion gasifier, with a solid product, for example iron sponge, being introduced into the fusion gasifier from the reduction shaft.

The invention is further characterized in that the process model is created with the dust deposition and dust redispersion taken into account. As a result, the influence of the dust contained in the reduction gas on the reduction process is taken into account. This takes place for example by the dust deposition being modelled by changing the volume fraction of the dust deposited.

It is also advantageous if the process model is created with non-linear properties of the solid matter taken into account. This permits a faithful description of the flow of solid matter, in particular whenever the solid matter is modelled as a Bingham-like fluid with a yield criterion, such as a Drucker-Prager, Von Mises or Tresca yield criterion. As a result, the presence of a critical shearing stress of a granular solid substance is taken into account, so that, for example, dead zones can be calculated.

As a result of the fact that states of equilibrium are taken into account in the modelling of the chemical and physical processes, and the temperature dependence is taken into account, the process model can replicate even better the real states in the reduction shaft.

In the modelling of the chemical and physical processes, kinetic theorems are used. By using the kinetic theorems, the chemical and physical processes are modelled in the process model as they proceed over time, which permits a simulation of the spatial reaction behaviour at every location in the reduction shaft. The term kinetic means in this context that a process under consideration proceeds with a certain velocity.

A preferred embodiment of the invention provides that the substances involved in the process are assigned to individual phases, such as for example the gas phase or at least one granular phase or at least one dust phase, in the process model. A granular phase is characterized by a specific grain size and by a specific raw material. The assignment to individual phases allows every phase to be modelled according to its physical or chemical properties.

It is consequently provided that, for each phase, a mass balance of this phase and the corresponding component balances are created. These can be used to determine the volume fraction and the chemical composition of the individual phases in the reduction shaft.

The element fractions of specific chemical elements, for example in the form of mass fractions, can be calculated from the component balances. For example, for calculating the degree of metallization, the mass fractions of iron can be calculated from the component fractions, such as mass fractions, of Fe, FeO, $Fe_2O_3$ in one or more phases.

It is further provided that, for the creation of an impulse balance and an energy balance, in each case a number of phases are combined into a group, the phases of one group having the same velocity, pressure and temperature field. This may take place in the form that the gas phase and the phase of the dust dispersed in the gas are assigned to a first group of gaseous phases and the granular phases and the phase of the dust deposited in the solid matter are assigned to a second group of solid phases, a corresponding impulse balance and an energy balance being created for each of these two groups. By combining the individual phases in two groups, which are then considered as two phases, the velocity, pressure and temperature distributions can be created in a particularly simple way.

A modular treatment of the individual processes allows them initially to be considered separately, it being possible for the equations, in particular differential equations, of the individual balances to be solved by the mathematical method best suited in each case.

In order to carry out the calculation of the process model, it is provided that the reduction shaft is discretized and the equations of the balances are solved by numerical methods, such as for example the method of finite differences, the method of finite elements, the method of finite volumes or the method of weighted residues. As a result, a numerical method that is sufficiently accurate and appropriate for each balance is available. At the same time, the resolution of the process model may be obtained by successive iteration of the calculation of the balances.

It is further provided that some of the chemical and/or physical properties of the substances involved in the process, in particular for the modelling of the chemical kinetics, the dust deposition and the behaviour of the solid matter, such as internal friction angles and cohesion, are determined from material tests. This ensures that material parameters taken into account in the process model coincide with the actual properties of the materials used.

A further development of the invention is that, to reduce the computing time by utilizing symmetries, the calculation of the process model is performed only for a three-dimensional subregion of the reduction shaft.

It is further provided that the geometry of the reduction shaft is taken over by data transfer from a CAD program. As a result, a change of the geometry of the reduction shaft can be made in the process model with little effort.

It is also advantageous if the results of the calculations are displayed graphically, for example as a sectional representation on a computer screen. As a result, for example, the result of the evaluation of the process model is made available in a clearly presented and quickly comprehensible form as the basis for further measures on the reduction shaft.

One application of the method according to the invention is that a suitable design of the reduction shaft is determined by repeated offline calculation of the process model with variation of the geometry of the reduction shaft. In the design of new reduction plants or the changing of existing reduction plants, an optimum geometry of the reduction shaft is determined in this way, whereby the operating capacity is increased in comparison with a non-optimized geometry. As a result, the geometry of the reduction shaft can be adapted for specific charge materials, for example for the use of iron ores in lump form. Furthermore, the influence of a change of geometry on the reduction process can be investigated in general. On the basis of the results of a repeated calculation of the process model, the geometry necessary for improved process control can be determined.

A further possible application is that the reduction process is optimized by repeated offline calculation of the process model with variation of the process parameters and/or specific charge materials and/or the boundary conditions. As a result, the effect on the reduction process of changes of the feedstock, changes in the raw material composition and changes of other process parameters are investigated. On the basis of the results of the repeated calculation of the process model, the process parameters or charge materials necessary for optimum process control can be determined.

It is further provided that the reduction process is controlled or optimized by online calculation of the process model with the current process parameters taken into account. This makes it possible, for example, for the operator in the control centre of the reduction plant to have better overall control of the reduction process.

The reduction process is optimized by maximizing the degree of metallization or achieving a prescribed degree of metallization of the reduced product with minimal consumption of raw material and/or energy. The evaluations of the process model carried out are to be assessed from this viewpoint.

The invention is explained in more detail by way of example on the basis of the following FIGS. 1 to 3.

Figure 1:
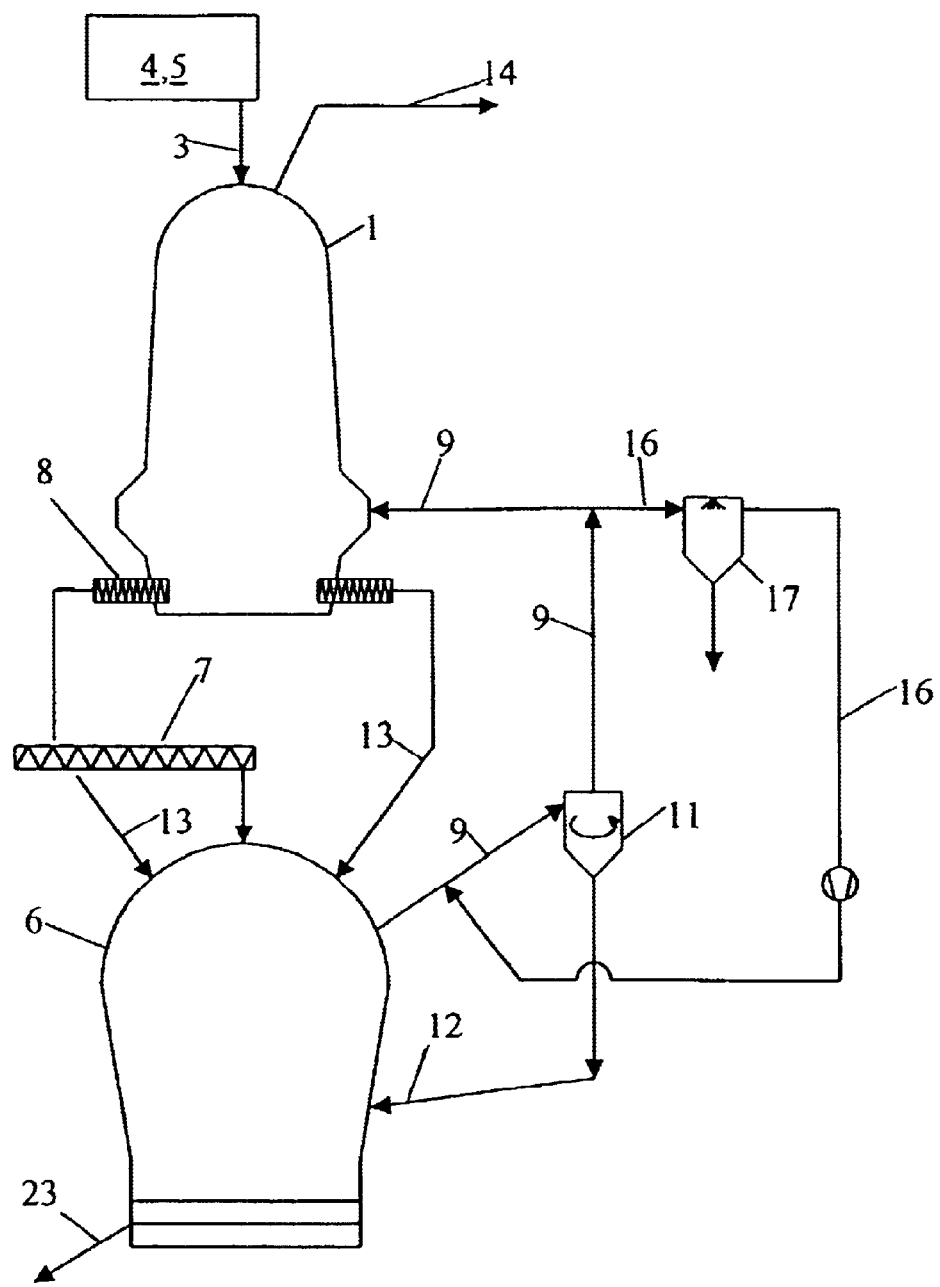
FIG. 1 shows the parts of a plant for carrying out a smelting reduction process that are essential for the invention.

In FIG. 1, iron ore 4 and additions 5 are together charged into a reduction shaft 1 as indicated by arrow 3 and, once the reaction has taken place, the product 13, essentially iron sponge, is discharged by conveying devices 8 and passed into the fusion gasifier 6, to which coal is also fed by a conveying device 7, the smelted product being drawn off as indicated by arrow 23. The reduction gas 9 generated in the fusion gasifier 6 is cleaned in a cyclone 11, with recycling of the deposited solids 12, and is subsequently introduced into the reduction shaft 1, where, once the reaction has taken place, it is drawn off as top gas 14. Part 16 of the reduction gas 9 is passed via a cooling and cleaning device 17 and subsequently returned to the reduction gas 9 upstream of the cyclone 11, whereby the reduction gas 9 is cooled to the temperature required in the reduction shaft 1.

Figure 2:
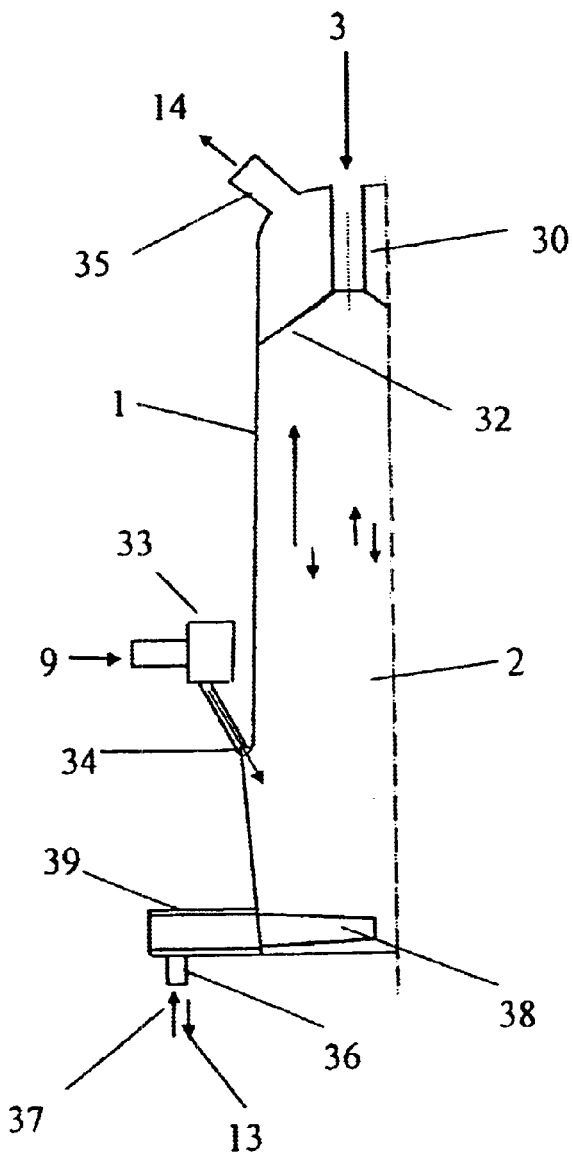
FIG. 2 shows a longitudinal section through a reduction shaft taken from the longitudinal axis.

In FIG. 2 it is shown how raw material 3, iron ore (for example with $Fe_2O_3$ as the iron carrier) and additions, are charged into the reduction shaft 1, referred to hereafter as shaft for short, by means of spider legs 30. In the slowly downwardly moving fixed bed 2, of which the tapered tip of feedstock 32 is represented, the iron ore is chemically transformed into iron sponge. The movement of the fixed bed, represented by two downwardly directed arrows, is enforced by screw conveyors 38 which are arranged at the bottom of the shaft 1, by means of which the iron sponge 13 is drawn off and which are surrounded on the outside of the shaft 1 by screw connecting stubs 39. The iron sponge 13 is brought into the fusion gasifier through downpipes 36, it being possible for downpipe gas to enter the shaft 1 through these downpipes, as indicated by arrow 37. The reduction gas 9, referred to hereafter as gas for short, flows via a bustle pipe 33, provided with inflow slits 34, into the shaft 1 and flows upwards, as indicated by the upwardly directed arrows, in countercurrent to the fixed bed 2 and via two pipes 35 out of the shaft again (top gas 14). Carbon monoxide (CO) and hydrogen ($H_2$) contained in the gas react chemically with the iron ore ($Fe_2O_3$), thereby producing the iron sponge (Fe).

Figure 3:
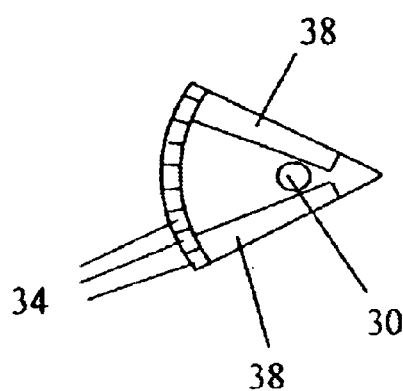
FIG. 3 shows a plan view of one sector of the reduction shaft.

FIG. 3 shows a sector of the shaft 1 from FIG. 2, this sector having a spider leg 30, which is arranged between two screw conveyors 38, and inflow slits 34 arranged over the entire circumference of the shaft.

Since the reduction rate drops sharply when the iron sponge is highly metallized, a small part of the reduction takes place in the fusion gasifier, aiming for a degree of metallization of around 90%.

Along with the iron ore, additions (limestone, dolomite) are charged into the shaft 1, in order to ensure the pig iron desulphurization and a low slag viscosity in the fusion gasifier 6. In the shaft 1, carbon dioxide is expelled from these additions, i.e. is fed to the gas 9, which is referred to as deacidifying or calcining.

The raw material 3 (iron ore, additions) is charged in a moist state and dried in the upper part of the shaft 1. Water is extracted from the burden 2 (=feedstock in the shaft=fixed bed) and fed to the gas 9. The raw materials 3 also contain inert substances which do not participate in the chemical reactions, such as the gangue in the case of iron ore.

The gas 9 flowing into the shaft 1 contains dust, which is partly deposited in the fixed bed 2. Already deposited dust can, however, be redispersed again into the gas 9 by a high local gas velocity.

The gas 9 essentially comprises carbon-, hydrogen- and oxygen-containing components (molecules), which can react chemically with one another, one of the effects of which being that even solid carbon is produced or consumed. Therefore, these reactions influence the dust content in the gas 9 or in the fixed bed 2.

The different inlet temperatures of gas 9 (several hundred degrees Celsius) and solid matter 2 (ambient temperature) into the shaft 1 and the heat tonality of the physical/chemical transformation processes give rise to differences in temperature between the solids 2 and gas 9, which are reduced by heat transfer.

The charged amount of raw material is generally controlled by the rotational speed of the screw conveyors 38. The amount of gas flowing through the shaft 1 is essentially increased by lowering the gas pressure above the fixed bed 2, and vice versa.

The aim of shaft operation is to set the desired degree of metallization of the ore, with at the same time good gas utilization, which means that as large a proportion as possible of the CO and $H_2$ present in the gas is transformed into $CO_2$ and $H_2O$ in the course of the ore reduction. This results in minimal consumption of resources, maximum cost-effectiveness and minimal environmental impact. Poor gas utilization has the opposite effect and may also mean that the desired degree of metallization is not reached.

On account of the boundary conditions (charging and discharging elements, inflow slits), the shaft is expediently modelled three-dimensionally. In order to shorten the computing time, therefore only one shaft sector (for example 30° C. or 60° C.) is generally considered, see FIG. 3. This sector is discretized and the equations of the balances (mass, component, impulse and energy balances) are solved, for example for each cell, by suitable numerical methods.

Influences which have the effect of an asymmetry in the shaft (charging which is not uniform over time and space, partly displaced bustle pipe and inflow slits) can be determined when considering only one shaft sector by periodic boundary conditions or by calculation runs with different boundary conditions performed one after the other. In principle, however, it is also possible for the entire shaft to be calculated, giving rise to longer computing times.

In modelling, the substances are assigned to individual phases. The gas forms a phase of its own and the dust entrained in the gas and the dust deposited into the fixed bed each form a phase of their own.

Each grain class and each raw material (ore, limestone, . . . ) represents a granular phase of its own. Therefore, the number of granular phases is equal to the product of the number of raw materials times the number of grain classes. For example, with 4 raw materials–2 types of ore, limestone and dolomite–and 6 grain classes between 0 mm and 50 mm, there are 24 granular phases. There are then altogether a total number of granular phases (for example 24)+2 dust phases+1 gas phase, that is to say for example 27 phases.

In a three-dimensional model, there are generally the following for each phase 1 mass balance, m−1 component balances, given m components, 1 vectorial impulse balance, 1 equation of state and 1 energy balance.

Each phase has a velocity of its own, pressure of its own and temperature of its own. Mass, impulse and heat are exchanged between the phases. This results in the following for each phase volume fraction of the phase, component fractions within the phase, velocity in three directions, pressure and temperature.

However, this strict procedure is only absolutely necessary when calculating the volume fractions and the component fractions within the individual phases. In the granular phases and in the dust phases it is possible to take diffusion into account, but not necessary.

For the impulse balances and energy balances, a number of phases are expediently combined into phase groups. For example, one group comprises all the granular phases and the dust phase of the dust deposited in the feedstock, and a further group comprises the gas phase and the dust phase of the dust dispersed in the gas. In this case, all the granular phases and the dust phase of the dust deposited in the feedstock have a common velocity, pressure and temperature field. Differing from this is the common velocity, pressure and temperature field of the gas phase and of the dust phase of the dust dispersed in the gas.

The model forming for the individual phases is described below. The balances are considered from a system of spatial coordinates (Eulerian consideration). Mass, impulse and energy flows, mass and energy sources and sinks as well as external forces are considered per cell volume.

The mass balance of a phase q about any desired grid cell in the reduction shaft is:

The change over time of the mass density of any desired phase q (gas, granular, dust)+ the sum of all convective mass flows which enter and leave the cell= the sum of all mass sources and sinks of the phase q in a cell.

$$\frac{\partial(\varepsilon_q\, \rho_q)}{\partial t} + \vec{\nabla} \cdot (\varepsilon_q\, \rho_q\, \vec{v}_q) = \sum_{p=1}^{N} \dot{m}_{pq} \quad (1)$$

where

| | |
|---|---|
| $\varepsilon_q$ | is the volume fraction of the phase q [–] |
| $\rho_q$ | is the density of the phase q [kg/m$^3$] |
| $\vec{v}_q$ | is the velocity of the phase q [m/s] |
| $\dot{m}_{pq}$ | is the mass flow from the phase p into the phase q [kg/(m$^3$s)] |
| $\vec{\nabla}$ | is the Nabla operator in vector form $\left[\frac{\partial}{\partial x'}\cdot\frac{\partial}{\partial y'}\cdot\frac{\partial}{\partial z}\right][1/m]$ |
| N | is the number of phases |
| t | is the time [s] |

The component balance of a component 1 in any desired granular or dust phase q (not gas phase) about any desired grid cell in the reduction shaft is:

The change over time of the mass density of a component 1 (for example Fe$_2$O$_3$, CaO etc.) in a phase q (granular or dust)+ the sum of all convective mass flows of a component 1 which enter and leave the cell= the sum of all mass sources and sinks of the component 1 in the phase q.

$$\frac{\partial(\varepsilon_q\, \rho_q\, m_{ql})}{\partial t} + \vec{\nabla} \cdot (\varepsilon_q\, \rho_q\, \vec{v}_q\, m_{ql}) = \sum_{p=1}^{N} \dot{m}_{pql} \quad (2)$$

where

| | |
|---|---|
| $\varepsilon_q$ | is the volume fraction of the phase q [–] |
| $\rho_q$ | is the density of the phase q [kg/m$^3$] |
| $m_{ql}$ | is the mass fraction of the component 1 in the phase q [–] |
| $\vec{v}_q$ | is the velocity of the phase q [m/s] |
| $\dot{m}_{pql}$ | is the mass flow of the component 1 from the phase p into the phase q [kg/(m$^3$s)] |
| $\vec{\nabla}$ | is the Nabla operator in vector form $\left[\frac{\partial}{\partial x'}\cdot\frac{\partial}{\partial y'}\cdot\frac{\partial}{\partial z}\right][1/m]$ |
| N | is the number of phases |
| t | is the time [s] |

In the case of the component balance of the gas phase g about any desired grid cell in the reduction shaft, it may be advisable to take a diffusion flow into account, for example if the mixture between reduction gas and downpipe gas is to be calculated. It is generally not absolutely necessary to take a diffusion flow into account:

The change over time of the mass density of a component 1 (for example CO, H$_2$ etc.) in the gas phase g+ the sum of all convective mass flows of a component 1 which enter and leave the cell= the diffusion flow of the component 1+ the sum of all mass sources and sinks of the component 1 in the gas phase g.

$$\frac{\partial(\varepsilon_g\, \rho_g\, m_{gl})}{\partial t} + \vec{\nabla} \cdot (\varepsilon_g\, \rho_g\, \vec{v}_g\, m_{gl}) = \quad (3)$$

$$\vec{\nabla} \cdot (\varepsilon_g\, \rho_g\, D_{g.1}\, \vec{\nabla} m_{gl}) + \sum_{p=1}^{N} \dot{m}_{pgl}$$

where

| | |
|---|---|
| $\varepsilon_g$ | is the volume fraction of the gas phase g [–] |
| $\rho_g$ | is the density of the gas phase g [kg/m$^3$] |
| $m_{gl}$ | is the mass fraction of the component 1 in the gas phase g [–] |
| $\vec{v}_g$ | is the velocity of the gas phase g [m/s] |
| $\dot{m}_{pql}$ | is the mass flow of the component 1 from the phase p into the gas phase g [kg/(m$^3$s)] |
| $D_{gl}$ | is the diffusion or dispersion coefficient of the component 1 in the gas phase g [kg/(m$^3$s)] |
| $\vec{\nabla}$ | is the Nabla operator in vector form $\left[\frac{\partial}{\partial x'}\cdot\frac{\partial}{\partial y'}\cdot\frac{\partial}{\partial z}\right][1/m]$ |
| N | is the number of phases |
| t | is the time [s] |

Element balances do not have to be set up. For verification (for example of the metallization), element fractions (for example mass fractions of Fe, O) are calculated from the component fractions (for example mass fractions of Fe, FeO, Fe$_2$O$_3$ in one or more phases).

The impulse balances are not necessarily created individually for each phase but may also be created for groups of phases. For example, the following phase groups are meaningful for the impulse balances:

Group q comprises the sum of all the granular phases and the dust phase of the dust deposited in the feedstock, Group g comprises the gas phase and the dust phase of the dust dispersed in the gas.

The vectorial impulse balance for the group of all the granular phases and the dust phase of the dust deposited in the feedstock is:

The change over time of the impulse density of the granular phases and of the dust phase of the dust deposited in the feedstock in a cell+ the sum of all the convective impulse flows of the granular phase and of the dust phase of the dust deposited in the feedstock out of and into a cell+ impulse flow sources and sinks which are a consequence of mass sources and sinks in the granular phases and in the dust phase of the dust deposited in the feedstock= the buoyancy through the continuous phase (gas)+the compressive force of the granular phases and of the dust phase in the feedstock on the cell+ forces caused by shearing stresses and normal stresses (stress deviator)+ the gravitational force+ the force of resistance between the gas and the solids caused by the adhesion of the gas to the surface of the solid matter.

$$\varepsilon_q \, \rho_q \frac{D\vec{v}_q}{Dt} = -\varepsilon_q \, \vec{\nabla} p_g - \vec{\nabla} p_q + \vec{\nabla}^T \cdot \vec{\tau}_q + \varepsilon_q \, \rho_q \, \vec{g} + K_{gq} \cdot (\vec{v}_g - \vec{v}_q) \quad (4)$$

where

| | |
|---|---|
| $\varepsilon_q$ | is the volume fraction of the granular phases and of the dust phase of the dust deposited in the feedstock [–] |
| $\rho_q$ | is the density of the granular phases and of the dust phase of the dust deposited in the feedstock [km/m³] |
| $\hat{V}_q$ | is the velocity of the granular phases and of the dust phase of the dust deposited in the feedstock [m/s] |
| $\hat{V}_g$ | is the velocity of the gas phase and of the dust phase g of the dust dispersed in the gas [m/s] |
| $p_g$ | is the pressure of the gas phase and of the dust phase g of the dust dispersed in the gas [Pa] |
| $p_q$ | is the pressure of the granular phases and of the dust phase of the dust deposited in the feedstock ("feedstock pressure") [Pa] |
| $\vec{\tau}_q$ | is the stress deviator of the granular phases and of the dust phase of the dust deposited in the feedstock [Pa]. Includes as parameters the internal friction angle and cohesion. |
| $\vec{g}$ | is the vector of the gravitational acceleration [m/s²] |
| $K_{gq}$ | is the coefficient of the impulse exchange between the granular phases and the dust phase q of the dust deposited in the feedstock on the one hand and of the gas phase and of the dust phase g of the dust dispersed in the gas on the other hand (is derived from the Ergun equation) |
| $\vec{\nabla}$ | is the Nabla operator in vector form $\left[\frac{\partial}{\partial x'} \cdot \frac{\partial}{\partial y'} \cdot \frac{\partial}{\partial z}\right][1/m]$ |
| D/Dt | is the total differential |
| t | is the time [s] |

The impulse balance for the group of the gas phase and the dust phase in the gas g differs formally from the impulse balance of the granular phases and the dust phase q of the dust deposited in the feedstock only by omission of the buoyancy:

The change over time of the impulse density of the gas phase and of the dust phase of the dust dispersed in the gas in a cell+ the sum of all the convective impulse flows of the gas phase and of the dust phase of the dust dispersed in the gas out of and into a cell+ impulse flow sources and sinks which are a consequence of mass sources and sinks in the gas phase and of the dust phase of the dust dispersed in the gas= the compressive force of the gas phase and of the dust phase of the dust dispersed in the gas on the cell+ forces caused by shearing stresses and normal stresses (stress deviator)+ the gravitational force+ the force of resistance between the gas and the solids caused by the adhesion of the gas to the surface of the solid matter.

$$\varepsilon_g \, \rho_g \frac{D\vec{v}_g}{Dt} = -\varepsilon_g \, \vec{\nabla} p_g + \vec{\nabla}^T \cdot \vec{\tau}_g + \varepsilon_g \, \rho_g \, \vec{g} + K_{qg} \cdot (\vec{v}_q - \vec{v}_g) \quad (5)$$

where

| | |
|---|---|
| $\varepsilon_g$ | is the volume fraction of the gas phase and of the dust phase of the dust dispersed in the gas [–] |
| $\rho_g$ | is the density of the gas phase and of the dust phase of the dust dispersed in the gas [km/m³] |
| $\hat{V}_q$ | is the velocity of the granular phases and of the dust phase of the dust deposited in the feedstock [m/s] |
| $\hat{V}_g$ | is the velocity of the gas phase and of the dust phase g of the dust dispersed in the gas [m/s] |
| $p_g$ | is the pressure of the gas phase and of the dust phase g of the dust dispersed in the gas [Pa] |
| $\vec{\tau}_g$ | is the stress deviator of the gas phase and of the dust phase of the dust dispersed in the gas [Pa] |
| $\vec{g}$ | is the vector of the gravitational acceleration [m/s²] |
| $K_{qg}$ | is the coefficient of the impulse exchange between the granular phases and the dust phase q of the dust deposited in the feedstock on the one hand and of the gas phase and of the dust phase g of the dust dispersed in the gas on the other hand (is derived from the Ergun equation) |
| $\vec{\nabla}$ | is the Nabla operator in vector form $\left[\frac{\partial}{\partial x'} \cdot \frac{\partial}{\partial y'} \cdot \frac{\partial}{\partial z}\right][1/m]$ |
| D/Dt | is the total differential |
| t | is the time [s] |

As an example, the energy balances are given again for the two phase groups mentioned under the impulse balances:

Group q comprises the sum of all the granular phases and the dust phase of the dust deposited in the feedstock, Group g comprises the gas phase and the dust phase of the dust dispersed in the gas.

The energy balance for the group of all the granular phases and the dust in the feedstock is as follows:

The change over time of the enthalpy density of the granular phases and of the dust phase of the dust deposited in the feedstock in a cell+ the sum of all the convective enthalpy flows of the granular phases and of the dust phase of the dust deposited in the feedstock out of and into a cell= the heat conduction flow through granular phases and of the dust phase of the dust deposited in the feedstock+ the heat transfer flow to all the granular phases and the dust phase of the dust deposited in the feedstock+ enthalpy sources and sinks which are a consequence of mass sources and sinks of the components in the granular phases and in the dust phase of the feedstock.

$$\frac{\partial(\varepsilon_q \rho_q h_q)}{\partial t} + \vec{\nabla} \cdot (\varepsilon_q \rho_q \vec{V}_q h_q) = \quad (6)$$

$$-\vec{\nabla} \cdot (\varepsilon_q \lambda_q \vec{\nabla} T_q) + H_{gq}(T_g - T_q) + \sum_{p=1}^{N} \sum_{l=1}^{M} \dot{m}_{pql} h_l$$

| | |
|---|---|
| $\varepsilon_q$ | is the volume fraction of the granular phases and of the dust phase q of the dust deposited in the feedstock [–] |
| $\rho_q$ | is the density of the granular phases and of the dust phase q of the dust deposited in the feedstock [km/m³] |
| $h_q$ | is the enthalpy of the granular phases and of the dust phase q of the dust deposited in the feedstock [J/kg] |
| $\hat{V}_q$ | is the velocity of the granular phases and of the dust phase of the dust deposited in the feedstock [m/s] |
| $\lambda_q$ | is the thermal conductivity of the phase group q [W/(mK)] |

-continued

| | |
|---|---|
| $H_{gq}$ | is the coefficient of heat exchange between the two phase groups [W/K] |
| $T_q$ | is the temperature of the granular phases and of the dust phase q of the dust deposited in the feedstock [K] |
| $T_g$ | is the temperature of the gas phase and of the dust phase g of the dust dispersed in the gas [K] |
| N | is the number of phases |
| M | is the number of components |
| $\dot{m}_{pql}$ | is the mass flow of the component l from the phase p into the phase q [kg/(m³s)] |
| $h_l$ | is the enthalpy of the component l [J/kg] |
| $\nabla$ | is the Nabla operator in vector form $\left[\frac{\partial}{\partial x}, \frac{\partial}{\partial y}, \frac{\partial}{\partial z}\right][1/m]$ |
| t | is the time [s]. |

The energy balance for the group comprising the gas phase and the dust phase of the dust dispersed in the gas is formally the same as for the group comprising the granular phases and the dust phase of the dust deposited in the feedstock. It is obtained by substituting the index q by g.

The volume fractions of the granular phases may either be prescribed in the entire calculation space (shaft sector) or determined advantageously from equations of state, see for example N. Ouchiyama and T. Tanaka 1988 "Porosity Estimations of Mixed Assemblages of Solid Particles with Different Packing Characteristics", Journal of Chemical Engineering of Japan, 21(2):157–163 or Johansen S. T., Laux H. "An Alternative Method for Numerical Solution of Dispersed Multiphase Flow Equations", Proceedings of the 2nd International Conference of Multiphase Flow", Kyoto, Japan 1995. The volume fractions of the dust phases result from the mass balance of the dust phases. Consequently, the volume fraction of the gas phase is also established, since the sum of the volume fractions of all the phases in a cell is equal to one.

The force of resistance in the impulse balances may be derived from all the known equations by which the flow of gas through porous media can advantageously be modelled, for example by the Ergun equation, see for example "Fluid flow through packed columns", Sabri Ergun, 1952, Chemical Engineering Progress, 48(2):89–94. The influence of segregation, dust deposition and cavities on the gas flow is registered by substance values, such as:

the local volume fraction of the granular phases and of the dust phase of the dust deposited in the feedstock
the local average particle diameter and
the local shape factor.

The effect of temperature, dust flow and chemical reactions on the flow of solid matter is registered by suitable parameters in the impulse balances of the solid phases, such as for example by the internal friction angle and the cohesion. In this way, phenomena such as core flow or the formation of dead zones between the discharging elements (for example screw conveyors) or bridging can be calculated. The dependence of these parameters on local states, such as for example temperature, dust volume fraction or sulphur content, also allow the calculation of abnormal shaft states caused by "sticking", "agglomeration" or "clustering" (=sticking together of particles owing to chemical bonding, such as Fe—Fe or Fe—S bonding, or owing to a liquid phase present between particles).

The influence of segregation can be taken into account to a degree of approximation by using the boundary conditions (setting a grain size distribution with an increased fine fraction in the spider leg). Swelling (=increase in volume of particles during the reduction) can be estimated to a degree of approximation by specifying a low density of FeO. The influence of grain disintegration and abrasion is taken into account by using suitable source-sink terms in the mass balances of the coarse granular phases.

The composition of the phases is discussed below. Each phase contains components which take part in certain physical/chemical transformation processes. All the solid components which take part in no physical-chemical transformation (gangue or $Al_2O_3$, $SiO_2$, etc.) can be grouped together as an inert-substance component. For example, the following composition of the gas phase, dust phases or granular phases is meaningful:

| | |
|---|---|
| gas: | $CO$, $CO_2$, $H_2$, $H_2O(g)$, $CH_4$, $N_2$ |
| ore 1 and ore 2: | $Fe_2O_3$, $FeO$, $Fe$, $H_2O(l)$, inert substances |
| limestone, dolomite: | $MgCO_3$, $MgO$, $CaCO_3$, $CaO$, $H_2O(l)$, inert substances |
| dust in the gas: | C, inert substances |
| dust in the fixed bed: | C, inert substances |

The model equations also apply if, for example, even more components in the dust or additional components such as $H_2S$ or cyanides are taken into account. Only the computing time becomes correspondingly longer.

In the source/sink terms of the balance equations presented, physical/chemical transformation processes are taken into account, such as for example drying of all the granular phases
ore reduction with CO and $H_2$ in a number of stages (hematite-magnetite-wustite-iron), it being possible to skip fast reduction stages such as for example the magnetite stage.
calcining of limestone and dolomite
chemical reactions in the C—H—O system: Boudouard reaction, homogeneous and heterogeneous water-gas reaction, methane disintegration reactions
dust deposition/dust redispersion: deposition of the dust contained in the gas into the fixed bed or redispersion of the dust contained in the fixed bed into the gas
grain disintegration, abrasion As an example, the balance for the component "carbon monoxide" (CO) is to be presented. CO occurs only in the gas phase. Source/sink terms in the CO balance are caused by ore reduction and by chemical reactions in the C—H—O system, such as for example the Boudouard reaction. Phases involved in the CO balance are consequently all ore and dust phases.

The sources and sinks in the balances can be modelled as desired. It is particularly advantageous for them to be made up of a potential (for example distance from thermodynamic equilibrium) and a velocity term (for example Arrhenius coefficient, product layer diffusion coefficient, mass transfer coefficient). The sources and sinks may, furthermore, be created for example as a function of the temperature T, that is to say have a form which is different for different temperature ranges or become effective only from a specific temperature. In the case of solids, the shape factor and the average grain diameter are included in the calculation of the sources and sinks. In the case of dust deposition/dust redispersion, the maximum possible dust volume fraction in the feedstock is decisive and depends on the grain size distribution of the feedstock and the local gas velocity. Dust deposition takes place whenever the volume fraction of the dust deposited is less than its equilibrium value, dust redispersion takes place if the volume fraction of the dust deposited is greater than its equilibrium value.

For the formulation of the sources and sinks of the chemical processes, customary parameters are used, such as for example the reaction order with respect to the conversion and stoichiometric coefficients.

On account of the dominance of the heat tonalities of the chemical reactions and to save computing time, mechanical work and energy dissipation due to friction have been ignored in the energy balances. Results would not be changed significantly if they were taken into account.

The solving of the model equations requires boundary conditions. These may be set up according to an existing or desired measurement and control scheme. If, for example, the pressure in the reduction gas and in the downpipe gas and the amount of top gas are measured during operation, pressure boundary conditions at the inlets of the downpipe gas and the reduction gas and a velocity boundary condition for the gas phase at the surface of the burden are set in the mathematical model.

Suitably chosen boundary conditions allow even complicated parts of the plant, such as discharging elements for example, to be modelled. The exact geometry and movement of the discharging element need not be modelled for this purpose; instead, the discharge behaviour is modelled in the form of a velocity boundary condition. For example, the discharge of the burden 2 can be represented by a velocity boundary condition at the discharging element (for example at the screw envelope=imaginary cylinder around turns of the screw conveyor 38). As a result, the movement of the screw itself need not be modelled.

The boundary conditions do not have to be restricted to values; instead, profiles of pressure, velocity, temperature, mass and volume fractions may also be prescribed. Periodic boundary conditions also allow asymmetrical conditions in a shaft sector to be reproduced.

The balance equations and boundary conditions include substance values and parameters which, on the one hand, can be taken from standard literature, such as for example molar masses, pure densities, heat capacities and the thermal conductivity of the refractory lining, and, on the other hand, have to be determined experimentally, such as for example the internal friction angles, reduction-kinetic parameters and discharge characteristics of the discharging elements. This permits a calculation of the shaft operating state that is specific to the raw material and specific to the plant.

In order to ensure a realistic description of the flow of solid matter, special attention must be paid to the material law required for determining the stress deviator or stress tensor. Simplest to apply is the linear material law for "Newtonian fluids", used as standard in flow mechanics. However, this does not allow the description of phenomena such as tapered tips of feedstock or dead zones, which occur in the case of granular materials. Non-linear material laws have to be used for this.

The material law for granular flow developed for this method and establishing a relationship between the stress tensor and the velocity gradient is a generalization of the classic Bingham material law ("Flows of Materials with Yield", T. C. Papanastasiou, 1987, Journal of Rheology 31(5), 385–404). "Bingham fluids" are usually materials with constant critical shearing stress, the material law for which allows motion only when the shearing stress actually prevailing exceeds the critical shearing stress. This critical shearing stress also occurs in the case of granular media, but it cannot be assumed to be constant there; instead, it is dependent on the pressure of the solid matter and material parameters, such as for example the internal friction angle of the material, and on the cohesion of the solid matter. The limit between the state of rest and motion is therefore described, for example, by a Drucker-Prager yield criterion: "Constitutive Equations for Engineering Materials, Volume 1: Elasticity and Modelling", W. F. Chen and A. F. Saleeb, 1994, Elsevier, Amsterdam [inter alia] and "Phenomenological models of viscoplastic, thixotropic and granular materials", A. Berker and W. E. VanArsdale, 1992, Rhelogica Acta 31, 119–138.

The density of the gas phase is established by the ideal gas law (using the average molar mass), which is adequate for the gas pressures considered (up to 5 bar). The density of the other phases results from the fractions and pure densities of the components.

Also taken into account in the substance value for the effective thermal conductivity $\lambda_q$ is that radiation component that transports heat from particle to particle.

The following processes in the reduction shaft or substance properties can be registered and described by the configuration according to the invention of the process model:

Inhomogeneities in the composition of the burden (ore, additions) can be simulated by repeated calculation of the process model with different conditions at the spider legs.

The influence of the local grain size distribution on the gas flow in the burden can be taken into account.

The moisture of the burden and the inert substances contained in the latter are taken into account.

The effect of the shaft geometry, such as for example conical expansions, on the processes in the shaft are quantitatively registered.

The geometry of the charging and discharging elements is taken into account, such as that the burden is charged via spider legs and removed via screw conveyors, which respectively cover only part of the cross-sectional surface area of the shaft.

The gas flows radially inwards from the inflow slits in the wall of the shaft.

The surface of the burden is formed as a tapered tip of feedstock, which has effects on the gas flow. The gas tends to leave predominantly at as great a radial distance as possible from the spider legs on account of the tapered tips of feedstock.

The local specific amount of gas depends on the local voids fraction, the local average particle diameter and the local particle shape, i.e. on the degree of segregation and on the generation of dust. The smaller the local voids fraction and the local particle diameters and the less spherical the local particles, the smaller the local specific amount of gas.

Parts of the bustle pipe and/or inflow slits clogged with dust cause uneven gassing through of the burden.

High levels of dust may cause channelling. Gas flows upwards through these channels in the burden without performing any reduction work. This can be taken into account for the gas flow by prescribing initial conditions.

The heat exchange between the gas and the solids is taken into account.

The reduction potential of the gas is changed by chemical reactions in the C—H—C system. For example, CO and $H_2$ are transformed into carbon in dust form ($C_{(s)}$), $CO_2$ and $H_2O$ by the Boudouard reaction and the heterogeneous water-gas reaction, and are consequently lost for the iron ore reduction.

A high local fraction of limestone and dolomite limits the temperature and reduces the reduction potential, since the calcining is endothermal and $CO_2$ is released.

The local specific amounts of gas are influenced by the fact that the gas flows into the burden from the wall, which produces an uneven distribution of the dust in the burden. The dust distribution in the shaft follows from the calculation.

The gas flows not only via the cyclone-bustle pipe-inflow slits path into the shaft; instead, part of the reduction gas takes the path directly from the fusion gasifier via the downpipes into the shaft.

Core flow can occur in convergent sections of the shaft (=downward cross-sectional constriction) and in the region of the screw conveyors.

If the burden is given a certain compressive strength
for example as a result of sticking or agglomeration or as a result of chemical bonds between particles, as a result of liquefied, re-solidified inert substances, as a result of incorporated dust-bridges can form via the screw conveyors.

The higher the temperature in the shaft, the greater the extent to which the processes responsible for sticking occur (sintering, liquid gangue or liquid iron-sulphur compounds). The maximum permissible temperature is limited by sticking/agglomeration.

The interaction
of raw-material-specific data, such as for example reaction-kinetic parameters of ores,
of operator-specific measures, such as for example a specific amount of gas,
of changes of geometry and/or scale, such as for example longer discharge screws,
and their effect on the performance of the shaft can be quantitatively investigated.

The following processes, which can be inferred in particular from the calculated pressure distribution, are also taken indirectly into account by the model:
The burden does not taper down uniformly over the entire cross section; instead, the burden can "hang" where the loosening rate is locally exceeded. The loosening rate is that empty pipe velocity of the gas at which the vertical, specific pressure loss on the gas side is equal to the vertical packing pressure (=product of the packing density of the burden times acceleration due to gravity, if the support of the burden on the wall or static feedstock is ignored).
The absolute gas velocity on entry into the shaft is much greater than the loosening rate. If the gas permeability in the lower shaft is too low, cavities and partial hanging can occur, starting from the inflow slits.

The method according to the invention makes it possible to optimize reduction processes and the product quality by changing the geometry or the process parameters in the case of different raw materials. As a result, the range of raw materials used can be widened.

What is claimed is:

1. A method for optimizing the design and operation of a reduction process in which iron-containing charge materials are exposed to a reduction gas in a reduction shaft to produce a reduced material for use in producing liquid pig iron or liquid primary steel, the method comprising the steps of:

defining a multi-dimensional mathematical-physical-chemical process model for the reduction shaft; evaluating the process model numerically to obtain operating parameters for a reduction shaft in the form of multi-dimensional spatial distributions of physical and chemical variables; and designing and operating the reduction process in accordance with the spatial distributions of the variables.

2. A method according to claim 1, wherein the process model is created with dust deposition and dust redispersion taken in to account.

3. A method according to claim 2, wherein the dust deposition is modelled by changing the volume fraction of the dust deposited.

4. A method according to claim 1, wherein the process model is created with non-linear properties of the solid matter taken into account.

5. A method according to claim 1, wherein solid matter is modelled as a Bingham-like fluid with a Drucker-Pager, yield criterion.

6. A method according to claim 1, wherein kinetic theorems are used in the modelling of the chemical and physical processes.

7. A method according to claim 1, wherein states of equilibrium are taken into account in the modelling of the chemical and physical processes.

8. A method according to claim 1, wherein the temperature dependence is taken into account in the modelling of the chemical and physical processes.

9. A method according to claim 1, wherein the substances involved in the process are respectively assigned to a gas phase, or at least one granular phase and at least one dust phase as appropriate, in the process model.

10. A method according to claim 9, wherein a granular phase is characterized by a specific grain size and by a specific raw material.

11. A method according to claim 9, wherein, for each phase, a mass balance of this phase and the corresponding component balances are created.

12. A method according to claim 11, wherein the element fractions of specific chemical elements are calculated from component balances.

13. A method according to claim 9, wherein, for the creation of an impulse balance and an energy balance, in each case a number of phases are combined into a group, the phases of one group having the same velocity, pressure and temperature field.

14. A method according to claim 13, wherein the gas phase, and the phase of the dust dispersed in the gas are assigned to a first group of gaseous phases and the granular phases and the phase of the dust deposited in the solid matter are assigned to a second group of solid phases, a corresponding impulse balance and an energy balance being created fore each of these two groups.

15. A method according to claim 11, wherein the reduction shaft is discretized and the equations of the balances are solved by numerical methods.

16. A method according to claim 1, wherein solid matter is modelled as a Bingham-like fluid with a Von Mises yield criterion.

17. A method according to claim 1, wherein, to reduce the computing time by utilizing symmetries, the calculation of the process. model is performed only for a three-dimensional subregion of the reduction shaft.

18. A method according to claim 1, wherein the geometry of the reduction shaft (1) is obtained by data transfer from a CAD program.

19. A method according to claim 1, wherein the results of the calculations are displayed graphically.

20. A method according to claim 1, wherein a suitable design of the reduction shaft is determined by repeated offline calculation of the process model with variation of the geometry of the reduction shaft.

21. A method according to claim 1, wherein the reduction process is optimized by repeated offline calculation of the process model with variation of the process parameters and/or specific charge materials and/or the boundary conditions.

22. A method according to claim 1, wherein the reduction process is controlled or optimized by online calculation of the process model with the current process parameters taken into account.

23. A method according to claim 1, wherein the reduction process is optimized by maximizing the degree of metallization of the reduced product with minimal consumption of raw material and/or energy.

24. A method according to claim 1, wherein solid matter is modelled as a Bingham-like fluid with a Tresca yield criterion.

25. A method according to claim 12, wherein the element fractions of specific chemical elements are calculated in the form of mass fractions.

26. A method according to claim 15, wherein the equations of the balances are solved by the method of finite differences.

27. A method according to claim 15, wherein the equations of the balances are solved by the method of finite elements.

28. A method according to claim 15, wherein the equations of the balances are solved by the method of finite volumes.

29. A method according to claim 15, wherein the equations of the balances are solved by the method of weighted residues.

30. A method according to claim 19, wherein the results of the calculations are displayed graphically as a sectional representation on a computer screen.

31. A method according to claim 1, wherein, for the purpose of modelling the chemical kinetics, one or more of the chemical and/or physical properties of the substances involved in the process, the dust deposition and the behaviour of the solid matter are determined from material tests.

32. A method according to claim 31, wherein the internal friction angles of the solid matter are determined from material tests.

33. A method according to claim 31, wherein the cohesion of the solid matter is determined from material tests.

* * * * *